Aug. 10, 1937.   J. R. WINTER   2,089,462
GREASE SEAL
Original Filed March 29, 1934
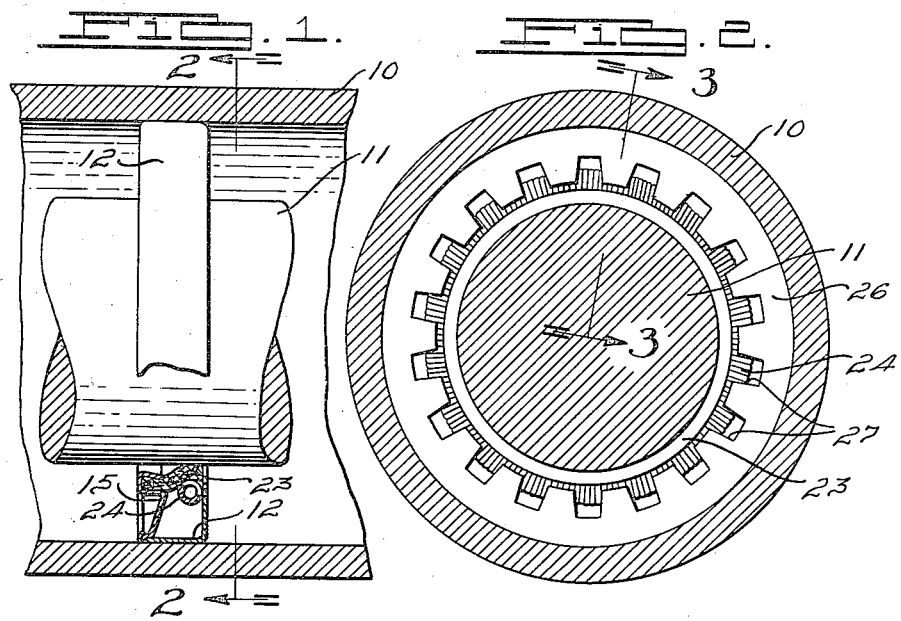
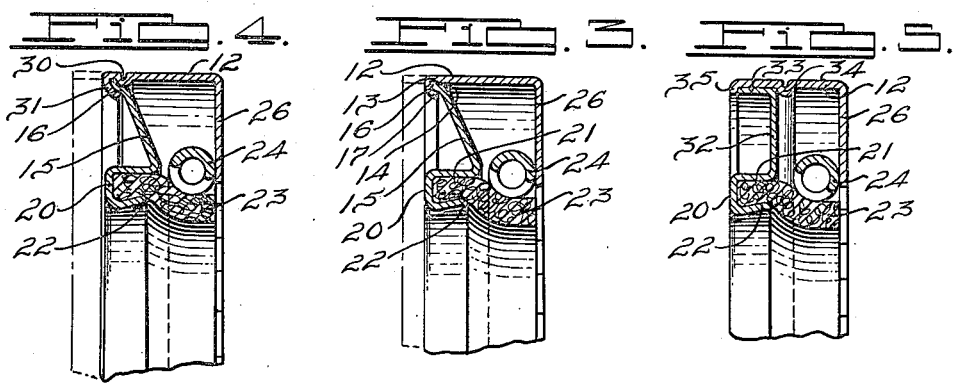
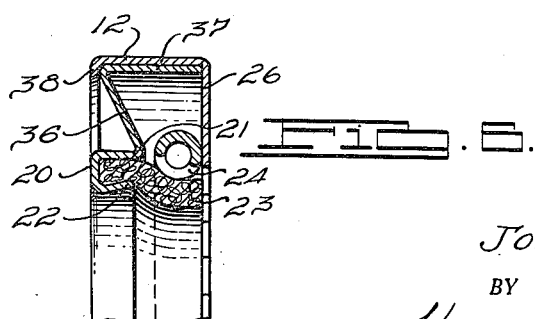
INVENTOR.
John R. Winter.
BY
Harness, Dickey, Pierce & Hans.
ATTORNEYS.

Patented Aug. 10, 1937

2,089,462

UNITED STATES PATENT OFFICE 2,089,462

GREASE SEAL

John R. Winter, Detroit, Mich.

Application March 29, 1934, Serial No. 717,929
Renewed March 31, 1937

1 Claim. (Cl. 288—1)

The invention relates to grease seals and it has particular relation to a grease seal adapted for use in a housing receiving a rotary shaft.

One object of the present invention is to provide a grease seal having an annular wall and an end wall wherein the end wall is initially separate from the housing and is rigidly associated therewith in a novel and efficient manner.

Another object of the invention is to provide a method of manufacturing a grease seal including a housing such as mentioned which is economical and which provides a construction wherein the parts are rigidly associated.

Other objects of the invention will become apparent from the following description taken in conjunction with the drawing and from the claim hereinafter set forth.

For a better understanding of the invention, reference may be had to the accompanying drawing forming a part of the specification, wherein:

Figure 1 is a fragmentary view of a housing and rotary shaft therein, illustrating a grease seal within the housing and around the shaft which is constructed according to one form of the invention.

Fig. 2 is a cross-sectional view taken substantially along the line 2—2 of Fig. 1.

Fig. 3 is a cross-sectional view on a larger scale taken substantially along the line 3—3 of Fig. 2, but with the shaft removed.

Fig. 4 is a cross-sectional view similar to Fig. 3 but illustrating another form of the invention.

Fig. 5 is a cross-sectional view also similar to Fig. 3 but illustrating another form of the invention.

Fig. 6 is a cross-sectional view of similar nature illustrating still another form of the invention.

Referring to Figs. 1 and 2, a shaft housing is indicated at 10 and a rotary shaft 11 extends axially through the housing and is journaled therein at points not shown as will readily be understood. The grease seal illustrated between the housing 10 and the shaft 11 comprises a sheet metal shell having an outer cylindrical wall 12 tightly fitting within the housing and at one end the wall has a short thinner portion of larger inside diameter as indicated at 13 which provides a shoulder 14. The shell also includes a sheet metal wall 15 directed at an angle to the wall 12 and which at its outer edge is deflected substantially into a radial position as indicated at 16 where it fits within the portion 13 and against the shoulder 14. In assembling and manufacturing the parts, after the wall 15 is so positioned, the overhanging and thinner portion 13 is then turned inwardly into embracing relation with the portion 16 of the wall 15 and it will be noted that such turned in portion underlies the deflected portion of the wall 15 as indicated at 16 so as to positively lock it in place. At its inner edge the wall 15 is provided with a channel 20 for receiving a radially offset portion 21 of an annular sealing ring constructed of leather or the like and after the sealing ring is positioned within the channel the inner leg of the latter may be turned outwardly as indicated at 22 so as to clinch the sealing ring within the channel.

Outwardly of the channel the sealing ring extends toward the axis and terminates in an axial portion 23 of smaller radius which is adapted to engage the shaft 11. This portion of the sealing ring is normally urged into engagement with the shaft by annular helical spring 24 and for maintaining the spring in place, the shell is provided with an inwardly directed end wall 26. The walls 12 and 26 are readily formed from flat sheet metal and by means of press operations well understood in the art, the wall 12 may readily be pressed into the cylindrical shape shown. As best shown by Fig. 2, the wall 26 is provided with circumferentially spaced slots 27 extending from its inner edge partially toward its outer edge and it will be noted in Fig. 2 that the slots are of such dimensions that lubricant may flow therethrough and over the periphery of the spring 24. This is advantageous in that it permits lubricant to freely flow into and out of the housing which acts as a cooling medium to the sealing ring 23, thereby avoiding early deterioration of the sealing ring by excessive temperature conditions. During operation of the seal, the shaft may float radially with respect to the housing if this is necessary, without injuring the action of the sealing ring as the portion 23 will float with the spring 24 in a radial plane as the shaft moves radially.

The construction shown by Fig. 4 is similar to that shown by Fig. 3 except that the wall 12 does not have the thinner portion 13 and has an annular, inwardly pressed bead 30 for locating the outer edge of the wall 15. After positioning the wall 15 with its outer edge against the bead 30, the end portion of the wall 12 is turned inwardly as indicated at 31 into embracing relation with the portion 16 of the wall 15 so as to firmly lock it in place. It will be noted that the outer edge portion 16 of the wall 15 is slightly angled to correspond with the shape of the bead 30.

The construction shown by Fig. 5 is also similar to the others but in this case an end wall indicated at 32 extends substantially radially and terminates at its outer edge in a cylindrical portion 33 which is located between a bead 34 on the end wall 12 and a turned-in edge 35.

The construction shown by Fig. 6 is also similar to the others but in this case an end wall 36 is provided which is angled toward the axis of the shell and then terminates in an oppositely directed cylindrical portion 37 which is disposed between the end wall 26 and an inwardly turned edge 38 at the opposite end of the cylindrical portion 12.

In all of the constructions illustrated it will be appreciated that the outer edge of the end wall having the channel for receiving the sealing ring, is so shaped that it is reinforced, thereby increasing the rigidity of the wall. It furthermore will be appreciated that any of the end walls illustrated may be readily assembled with the remainder of the shell by axially inserting the wall until it is seated against the shoulder, bead or end wall 26 as the case may be, and then that the wall may be positively positioned and held in place by turning in the end portion of the cylindrical wall. Normally, the sealing ring is inserted and clinched in the channel previous to inserting the wall and following insertion of the latter, the spring is applied and then the wall 26 is turned inwardly to hold the spring in place. The slots 27 provide openings through which lubricant may circulate around and within the shell so as to cool the sealing ring and prevent its deterioration as a result of excessive temperature. It should be apparent that the relation between the outer edge of the end wall and the cylindrical wall of the shell is such that the joint is sealed at this point, and, accordingly, in conjunction with the tight fit of the wall 12 with the housing 10 and the sealing engagement of the sealing ring with the shaft, lubricant cannot flow axially past the shell from one side thereof to the other.

Although more than one form of the invention has been illustrated and described in detail, it will be apparent to those skilled in the art that various modifications may be made without departing from the scope of the appended claim.

I claim:

A seal for insertion as an assembled unit in a housing about a shaft, comprising an annular sheet metal wall for pressed fit engagement with the inside of the housing, a separate sheet metal end wall for the seal which is located adjacent one end of said annular wall in axially spaced relation to the other end and is provided adjacent its inner edge with an axially directed channel which is separated from the annular wall by an intervening web-like portion of the end wall, a tubular sealing ring having one of its ends clamped within the channel, and means interlocking the outer edge portion of the end wall with the annular wall in rigid fluid-tight association, said means comprising a shoulder formed on the inside of the annular wall in engagement with one side of the end wall and a turned-in end portion on the annular wall in rigidly clamped engagement with the opposite side of the end wall.

JOHN R. WINTER.